US008638461B2

(12) United States Patent
Kwon

(10) Patent No.: US 8,638,461 B2
(45) Date of Patent: Jan. 28, 2014

(54) IMAGE FORMING APPARATUS AND METHOD FOR PROVIDING USER INTERFACE SCREEN OF IMAGE FORMING APPARATUS

(75) Inventor: Jung-hyuk Kwon, Suwon-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 221 days.

(21) Appl. No.: 13/064,692

(22) Filed: Apr. 8, 2011

(65) Prior Publication Data

US 2011/0261380 A1 Oct. 27, 2011

(30) Foreign Application Priority Data

Apr. 22, 2010 (KR) ........................ 10-2010-0037277

(51) Int. Cl.
*G06F 3/12* (2006.01)
*G06K 15/00* (2006.01)

(52) U.S. Cl.
USPC ......................... 358/1.15; 358/1.18; 358/1.13

(58) Field of Classification Search
None
See application file for complete search history.

(56) References Cited

U.S. PATENT DOCUMENTS

2006/0056871 A1* 3/2006 Kim ................................ 399/81
2008/0307319 A1* 12/2008 Iwata et al. ................... 715/748
2011/0134475 A1* 6/2011 Ooba ........................... 358/1.15
2011/0153729 A1* 6/2011 Kawai et al. .................. 709/203
2012/0144222 A1* 6/2012 Ito ................................ 713/340

FOREIGN PATENT DOCUMENTS

JP 2009-043131 2/2009

OTHER PUBLICATIONS

R. Fielding et al., "Hypertext Transfer Protocol—HTTP/1.1", The Internet Society, Jun. 1999, pp. 1-114.

* cited by examiner

*Primary Examiner* — Dov Popovici
(74) *Attorney, Agent, or Firm* — Staas & Halsey LLP

(57) ABSTRACT

An image forming apparatus and a method for providing a user interface (UI) screen of the image forming apparatus are provided. The image forming apparatus receives a UI screen to be displayed on a display unit thereof from a web server that is connected to a web browser of the image forming apparatus. In some embodiments, a UI screen corresponding to screen information of the display unit and apparatus information of the image forming apparatus is received from the web server and displayed.

20 Claims, 16 Drawing Sheets

FIG. 5

```
GET /homescreen HTTP/1.1
Host: www.myprinter.com
User-Agent: CLX-9000 7Inch 1024x600 TouchScreen
```

FIG. 6

```
<html>
<head><title>homescreen</title></head>
<body>
 ....
 ...
</body>
</html>
```

FIG. 7

```
<?php
// Get user-agent info from client
$useragent = $_SERVER['HTTP_USER_AGENT'];

// User-Agent: CLX-9050 9000 7Inch 1024x600 TouchScreen
//UserAgent Parse info, separate text string with spaces
$device_info = explode($useragent,' ');
// $device_info[0] ← Model Name : CLX-9050
// $device_info[1] ← Screen Size : 7Inch
// $device_info[2] ← Screen Resolution : 1024x600
// $device_info[3] ← Screen Type : TouchScreen

switch ($device_info[1]) {
        case '7Inch' : show7Inch(); break;
        case '4Inch' : show4Inch(); break;
        case '4Line' : show4Line(); break;
}
?>
```

FIG. 8

GET /XOA HTTP/1.1
Host: www.myprinter.com
User-Agent: CLX-9000 7Inch 1024x600 TouchScreen

FIG. 9

```
GET /homescreen HTTP/1.1
Host: www.myprinter.com
User-Agent: CLX-9000 7Inch 1024x600 TouchScreen  Scan/Print/Copy/Fax
```

FIG. 10

```
<html>
<head><title>homescreen</title></head>
<body>
 ....
 ...
</body>
</html>
```

FIG. 11

```
<?php
// Get user-agent info from client
$useragent = $_SERVER['HTTP_USER_AGENT'];
//UserAgent Parse info, separate text string with spaces
// User-Agent: CLX-9000 [8 Inch] 1024x600 TouchScreen Scan/Print/Copy/

$device_info = explode($useragent,' ');
// $device_info[4] ← Features

$feature_info = explode($device_info[4],'/');

foreach ($feature_info as $fi )
{
If ($fi == 'Scan') showScan();
If ($fi == 'Print') showPrint();
If ($fi == 'Copy') showCopy();
If ($fi == 'Fax') showFax();
}
?>
```

IMAGE FORMING APPARATUS AND METHOD FOR PROVIDING USER INTERFACE SCREEN OF IMAGE FORMING APPARATUS

CROSS-REFERENCE TO RELATED APPLICATIONS

This application claims priority benefit from Korean Patent Application No. 10-2010-0037277, filed on Apr. 22, 2010, in the Korean Intellectual Property Office, the disclosure of which is incorporated herein by reference in its entirety.

BACKGROUND

1. Field

Apparatuses and methods consistent with the disclosure provided herein relate to an image forming apparatus and a method for providing user interface screen of an image forming apparatus.

2. Description of the Related Art

An image forming apparatus encompasses a wide range of devices that outputs image data such as digital/analogue copier, printer, facsimile, scanner and multi function peripheral (MFP). Among these, the MFP operates to provide two or more functions including copying, printing, scanning, faxing or transmitting files.

The image forming apparatus may either have an embedded web server (EWS) or a web browser therein to communicate with the web server.

The embedded web browser of the image forming apparatus has an access to photos, animation, sound and video of the web server, and may search or output web pages including HTML (or XHTML), CSS (Cascading Style Sheet), JavaScript, Flash, photo, or video.

The image forming apparatus includes a display unit with respective user interface (UI) screens corresponding to the copying, printing, scanning, faxing, or file transmitting functions. For example, the display unit may include a UI screen corresponding to copying, a UI screen corresponding to scanning, or a UI screen corresponding to faxing, individually.

Further, the UI screen may typically be stored in the image forming apparatus. By way of example, the UI screen may be stored on HDD, ROM, or RAM.

SUMMARY

Exemplary embodiments overcome the above disadvantages and other disadvantages not described above. Also, the embodiment or embodiments is/are not required to overcome the disadvantages described above, and an exemplary embodiment may not overcome any of the problems described above.

According to one embodiment, an image forming apparatus and a method for providing user interface screen of the image forming apparatus are provided, including receiving a user interface screen displayed on a display unit using screen information of the display unit and apparatus information of the image forming apparatus from a web server connected to a web browser of the image forming apparatus.

In one embodiment, an image forming apparatus may be provided, including a display unit which displays a user interface (UI) screen corresponding to at least one function, a first communication interface unit which is connectable to a web server, a first storage unit which stores therein screen information of the display unit and apparatus information of the image forming apparatus, and a control unit which controls so that at least one of the screen information of the display unit and the apparatus information of the image forming apparatus is transmitted to the web server via the first communication interface unit, a UI screen corresponding to at least one of the screen information and the apparatus information is received from the web server, and the received UI screen is displayed on the indicating unit.

The screen information may include a size or a resolution of the screen, or presence of touch screen.

The apparatus information may include at least one of: at least one function supported by the image forming apparatus; a model name of the image forming apparatus; and a device ID of the image forming apparatus.

The control unit transmits at least one of the screen information and the apparatus information using a request header of a web browser, and the request header may include at least one of an address of the web server, and a user agent corresponding to the screen information and the apparatus information.

The UI screen is generated based on a web-based language.

The web server may include at least one of an external web server accessible via the first communication interface unit, and an embedded web server (EWS) of the image forming apparatus.

If power is supplied to the image forming apparatus, or if it is necessary to change the UI screen of the indicating unit, the control unit requests the web server for the UI screen corresponding to the screen information and the apparatus information.

In one embodiment, a web server connectable to an image forming apparatus may be provided, including a second communication interface unit connectable to a web browser of the image forming apparatus, and a second control unit which controls so that screen information of the display unit and apparatus information of the image forming apparatus are extracted from a request header of the web browser, and a UI screen corresponding to the extracted screen information and apparatus information is transmitted to the image forming apparatus via the second communication interface unit.

The web server may additionally include a second storage unit which stores a UI screen displayed on a display unit of the image forming apparatus, wherein the second control unit transmits to the image forming apparatus at least one of a UI screen stored in the second storage unit and a UI screen dynamically generated according to the screen information and the apparatus information.

The dynamically-generated UI screen is generated in serverside scripting language.

In one embodiment, a method for providing a user interface (UI) screen of an image forming apparatus comprising a display unit and a web browser, may be provided, including if a power is supplied to the image forming apparatus, transmitting screen information of the display unit and apparatus information of the image forming apparatus to a web server via a first communication interface unit using the web browser, receiving a UI screen corresponding to the screen information and the apparatus information from the web server, and displaying the received UI screen on the indicating unit, wherein the UI screen indicates at least one of the functions of copying, scanning, faxing and file transmitting supported by the image forming apparatus.

The screen information may include a size or a resolution of the screen, or presence of touch screen.

The apparatus information may include at least one of: at least one function supported by the image forming apparatus; a model name of the image forming apparatus; and a device ID of the image forming apparatus.

The transmitting of the screen information and the apparatus information to the web server comprises transmitting a request header of the web browser to the web server, and the request header may include at least one of an address of the web server and a user agent corresponding to the screen information and the apparatus information.

The transmitting of the screen information of the display unit and the apparatus information of the image forming apparatus is carried out, if a power is supplied to the image forming apparatus or if it is necessary to change the UI screen of the indicating unit.

The received UI screen is at least one of a UI screen previously stored on the web server corresponding to the display unit of the image forming apparatus, or a dynamically generated UI screen.

The received UI screen is generated in web-based language.

The method may additionally include providing option information regarding at least one function supported by the image forming apparatus to the web server, wherein the receiving of the UI screen from the web server may include receiving the UI screen reflecting the option information.

The method may additionally include analyzing to determine if the received UI screen may be displayed on the indicating unit, wherein if determining that it is impossible to display the UI screen, a warning message is displayed on the indicating unit.

BRIEF DESCRIPTION OF THE DRAWINGS

The above and/or other aspects will be more apparent by describing certain exemplary embodiments with reference to the accompanying drawings, in which:

FIG. 5 is a view illustrating an example of request header according to an aspect;

FIG. 6 is a view illustrating a source of a static user interface screen corresponding to the request header according to an aspect;

FIG. 7 is a view illustrating an example of a source of a user interface screen dynamically generated corresponding to a request header according to an aspect;

FIG. 8 is a view illustrating an example of a request header according to an aspect;

FIG. 9 is a view illustrating an example of a request header including at least one function according to an aspect;

FIG. 10 is a view illustrating a source of a user interface screen corresponding to a request header that includes at least one function according to an aspect;

FIG. 11 is a view illustrating a source of a user interface screen dynamically generated in response to a request header that includes at least one function according to an aspect;

DETAILED DESCRIPTION

Figure 1:
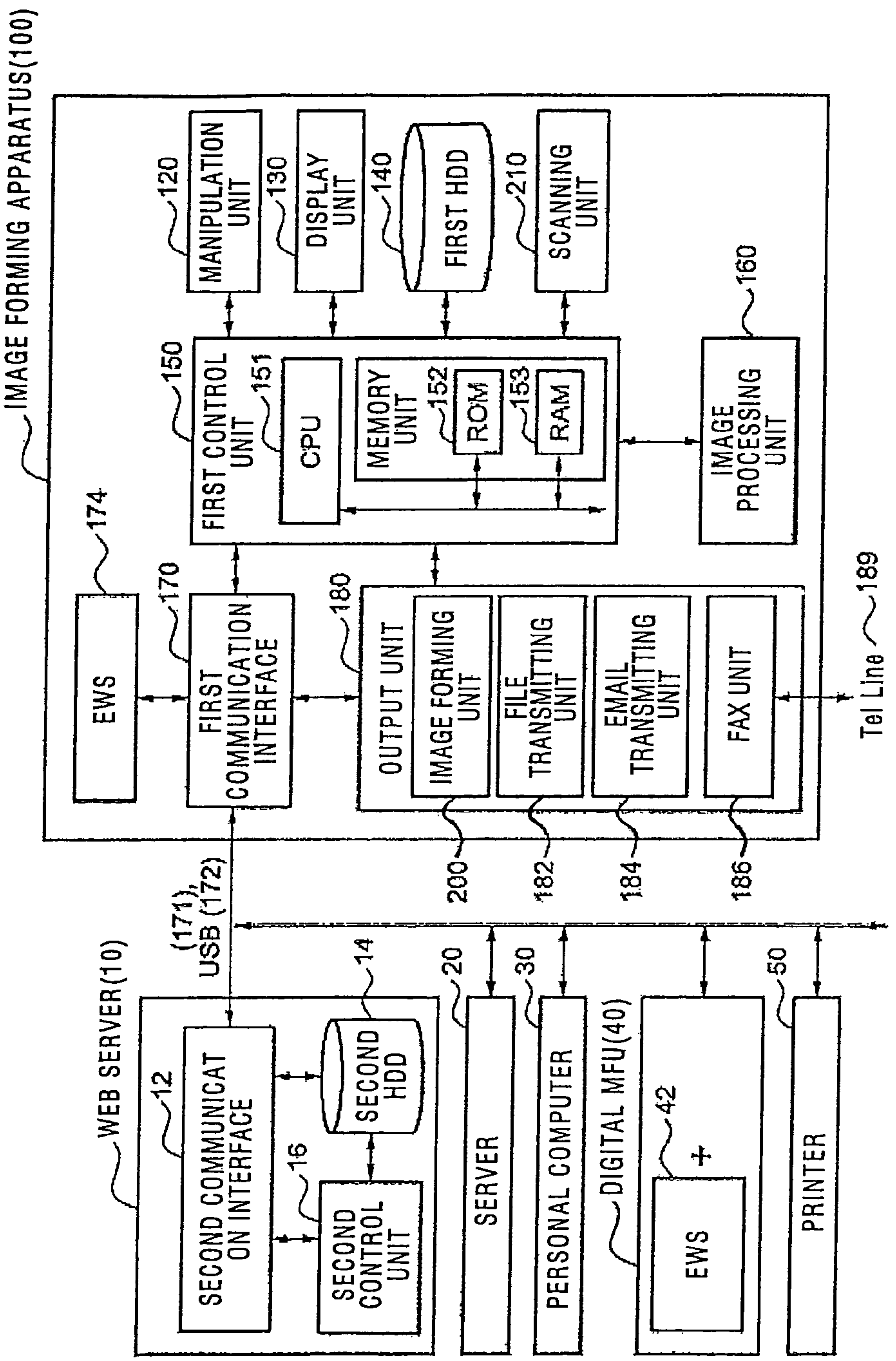
FIG. 1 is a view illustrating an image forming apparatus and a web server according to an embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding. Accordingly, it is apparent that the exemplary embodiments may be carried out without those specifically defined matters. Also, well-known functions or constructions are not described in detail since they would obscure the invention with unnecessary detail.

FIG. 1 illustrates in detail an image forming apparatus and a web server according to an embodiment.

Referring to FIG. 1, the image forming apparatus 100 according to an embodiment is connected to a wired or wireless network 171 and also accessible to a universal serial bus (USB) 172. The image forming apparatus is connectable to at least one web server 10, at least one server 20, or at least one personal computer 30 via the wired or wireless network 171 and the USB 172, and also connectable to at least one digital multi function unit (MFU) 40 and at least one printer 50. The image forming apparatus 100 herein includes the digital MFU 40 and the printer 50.

The image forming apparatus 100 scans a document and outputs generated image data on a recording medium.

Further, since the image forming apparatus 100 is connected to the wired or wireless network 171, the USB 172, and a telephone line 189 (Tel line), the image forming apparatus 100 may transmit the generated image data to outside via the wired or wireless network 171, the USB 172, or the Tel line 189, or store the generated image data therein according to a control by a first control unit 150. In order to transmit the generated image data outside, the generated image data may be stored according to a file format and then transmitted. The file format may include a variety of formats including but not limited to TIFF, JPEG, or PDF, and also added or editable depending on the image forming apparatus 100.

The image data, received from outside via the wired or wireless network 171 and the USB 172, may be stored at a first hard disk drive (HDD) 140 according to a control by the first control unit 150.

The 'image data' herein refers to at least one piece of data selected from print data, fax data, scan data, and copy data, or any combination thereof, depending on the functions that are achievable by the image forming apparatus 100.

The image forming apparatus 100 may include a scan unit 210, a manipulation unit 120, a display unit 130, a first HDD 140, a first control unit 150, an image processing unit 160, a first communication interface unit 170, and an output unit 180 that may include at least one of an image forming unit 200, a file transmitting unit 182, an email transmitting unit 184, and a fax unit 186.

The manipulation unit 120 receives a user input to operate the image forming apparatus 100.

The display unit 130 displays functions supportable by the image forming apparatus 100, such as copying, scanning, faxing, or transmitting files, and also displays status of the image forming apparatus 100 and user input provided from the manipulation unit 120.

The display unit 130 may include a line LCD for display purpose only, and a touch screen for both manipulation and display purposes. The line LCD or touch screen of the display unit 130 may have various appropriate screen sizes and resolutions depending on the apparatus information of the image forming apparatus 100.

The screen information of the display unit 130 may include information as to screen size of the display unit 130, resolution information, or whether or not the display unit 130 includes a touch screen. Further, the apparatus information of the image forming apparatus 100 may include information about the functions supported by the image forming apparatus 100, such as, for example, information about the model name of the image forming apparatus, or information about device ID of the image forming apparatus 100.

The user interface (UI) screen displayed on the display unit may be received from the web server 10, and the UI screen received from the web server 10 may correspond to the screen information of the display unit 130 and the apparatus information of the image forming apparatus 100.

The UI screen may be received from the web server 10 which is external to the image forming apparatus 100, the embedded web server 42 of the digital MFU 40, or the embedded web server 174 of the image forming apparatus 100. In this embodiment, the UI screen is received from the web server 10.

The first HDD 140 stores therein a UI screen received from the web server 10. Further, the first HDD 140 may store the screen information of the display unit 130 to receive a UI screen, and the apparatus information of the image forming apparatus 100. In other embodiments, the UI screen, the screen information, and the apparatus information may be stored on the ROM 152 or the RAM 153 of the first control unit 150, for example. Further, the first HDD 140, the ROM 152, and the RAM 153 may store the UI screen, the screen information, and the apparatus information, and, further store image data generated from scanning of a document through the scanning unit 210 or fax data received from outside, according to a control of the first control unit 150.

The image data corresponding to the document scanned by the scanning unit 210 is processed at the image processing unit 160 according to a control by the first control unit 150 and may be output onto a recording medium, transmitted as a file to an external server, emailed or faxed.

The fax unit 186 compresses the image data generated by scanning a document according to a control by the first control unit 150, and transmit the compressed image data to a receiver fax or MFU with fax function via the Tel line 189.

The transmitted image data may be stored on the first HDD 140, and the compressed image data received from outside may be decompressed according to a control by the first control unit 150 to be either output onto a recording medium by the image forming unit 200 or stored on the first HDD 140. Herein, the stored image data may be output at the output unit 180 according to user's instruction to the manipulation unit 120. That is, the image data may be output onto a recording medium, transmitted to an external server according to file transmission function, transmitted according to email function, or transmitted according to 'fax re-sending' function.

The image forming apparatus 100 according to an embodiment may be connectable to at least one web server 10, at least one server 20, or at least one personal computer 30 via the first communication interface unit 170, and according to a control of the first control unit 150, may output print data received from the server 20 or the personal computer 30 through the image forming unit 200 or store the print data on the first HDD 140.

The first control unit 150 may include a central processing unit (CPU) 151, a read only memory (ROM) 152 storing therein a control program, or a random access memory (RAM) 153 implementable as a memory region related to input data or jobs, in which the CPU 151, the ROM 152, and the RAM 153 are connectable to each other. The first control unit 150 also controls the manipulation unit 120, the display unit 130, the first HDD 140, the scanning unit 210, the image processing unit 160, the first communication interface unit 170, and the output unit 180.

The first control unit 150 may control the manipulation unit 120 which receives user inputs, and also controls the feeding of recording medium into the image forming apparatus 100. Further, the first control unit 150 may control a motor related to driving of optical system, or control at least one clutch or at least one solenoid. That is, the first control unit 150 may monitor and control the overall operations of the image forming apparatus 100.

Further, a plurality of first control unit 150 may be implemented. To be specific, the first control units 150 may be provided individually to correspond to the scanning unit 210, the manipulation unit 120, the display unit 130, and the image forming unit 200, respectively. By way of example, there may be two controls units, i.e., a control unit A (not illustrated) corresponding to the image forming apparatus 100 and a control unit B (not illustrated) corresponding to the display unit 130. In such example, a request for UI screen to the web server 10 is controlled by the control unit A, and displaying the received UI screen on the display unit 130 is controlled by the control unit B. The manipulation unit 120 and the display unit 130 may be controlled by the control unit B. However, it should be noted that the above examples are provided only for illustrative purpose, and changes are possible according to manners and goals of embodiments.

The image signal output from the scanning unit 210 is inputted to the image processing unit 160, and the image processing unit 160 processes the inputted image signal according to options set according to the user's inputs provided from the manipulation unit 120 and generates image data.

The first communication interface unit 170 is connectable to at least one web server 10, at least one server 20, or at least one personal computer 30 via the wired or wireless network 171 and the USB 172. Further, the first communication interface unit 170 is connectable to at least one digital MFU 40, or at least one printer 50. The digital MFU 40 herein includes embedded web server (EWS) 42. The image forming apparatus 100 may access the EWS 42 using the web browser, store the UI screen of the image forming apparatus 100 in the EWS 42, or receive the stored UI screen using the web browser.

The image forming apparatus 100 may also include a EWS 174 and receive UI screen from the EWS 174.

The digital MFU 40 or printer 50 having the web browser may access the EWS 174 of the image forming apparatus 100 and receive UI screen displayed on the display unit (not illustrated) of the digital MFU 40 or the printer 50.

The output unit 180 includes at least one of: the image forming unit 200 which prints print data on a recording medium according to a control by the first control unit 150, the file transmitting unit 182 which transmits the print data to an external server, the email unit 184 which transmits print data as an attached file, or the fax unit 186 which transmits the image data to a receiver facsimile. The file transmitting unit 182 and the email unit 184 of the output unit 180 each transmits the print data to the server 20, the personal computer 30, the digital MFU 40, or the printer 50 via the first communication interface unit 170 according to a corresponding function and under a control by the first control unit 150.

The web server 10 includes a second communication interface unit 12, a second HDD 14, and a second control unit 16.

The second communication interface unit 12 is connected to the image forming apparatus 10 by wired or wireless network 171, or the USB 172.

The second HDD 14 stores therein a user interface screen corresponding to at least one of screen information of the display unit 130 and apparatus information of the image forming apparatus 100 which is connected to the web browser.

The image forming apparatus 100 may access the web server 10 using a request header, and request and receive a UI screen that is necessary for the image forming apparatus 100.

The request header of the web browser includes at least one of web server address, screen information of the display unit 130, or user-agent corresponding to the apparatus information of the image forming apparatus 100.

The apparatus information of the image forming apparatus 100 may include information about at least one function of the image forming apparatus, or information about device ID of the image forming apparatus, and the screen information of the display unit 130 may include information about screen size of the display unit 130, information regarding resolution, or information as to whether or not the display unit 130 consists of a touch screen.

The second control unit 16 analyzes the request header of the image forming apparatus 100, searches the second HDD 14, and selects the UI screen requested by the image forming apparatus 100. The selected UI screen is transmitted via the second communication interface 12. Herein, the UI screen may be selected by searching the ROM (not illustrated) or the RAM (not illustrated) within the second control unit 16. The second HDD 14, and the ROM or RAM of the second control unit 16 are defined herein as a second storage unit and an embodiment will be explained below using the second HDD 14 as an example of the second storage unit.

The second control unit 16 may search static UI screen stored in the second HDD 14 using the analyzed request header.

Further, a lookup table (not illustrated) may be utilized in which case the lookup table may have appropriate form suitable for the apparatus information of the image forming apparatus 100 and the screen information of the display unit 130. By way of example, a horizontal axis of the lookup table may be filled with apparatus information of the image forming apparatus 100, and a vertical axis is filled with screen information of the display unit 130.

Further, the second control unit 16 may analyze the request header and generate a UI screen dynamically corresponding to one of the screen information of the display unit 130 and the apparatus information of the image forming apparatus 100.

The dynamic UI screen may be generated by executing a source code stored in the second storage, if there is no static UI screen stored, or alternatively, generated by scaling up or down to enlarge or reduce the static UI screen as stored.

The second control unit 16 may generate a dynamic UI screen using serverside scripting language.

Among the scripting languages used in web, the serverside scripting language such as Hypertext Preprocessor (PHP), Active Server Pages (ASP), Java Server Pages (JSP) is executed on the side of server, and the serverside scripting language explained herein may include other various languages as well as those mentioned above.

Further, the second control unit 16 may generate a static UI screen as stored using scaling. By way of example, it is assumed that the second HDD 14 stores therein 7-inch CLX-9000 model and 4-inch UI screen. If UI screen is requested with respect to 6-inch CLX-9000 model, the second control unit 16 needs to either reduce the stored 7-inch UI screen or enlarge the 4-inch UI screen. The dynamic UI screen is generated using the reduced or enlarged UI screen.

The generated dynamic UI screen may be either transmitted to the image forming apparatus 100 or stored in the second storage unit before or after being transmitted to the image forming apparatus 100. On the stored dynamic UI screen, a file name is given, and the stored dynamic UI screen may be re-used upon request by the image forming apparatus using the given file name.

That is, the second control unit 16 may analyze the request header of the image forming apparatus, and transmit the previously stored UI screen, or generate and transmit a new dynamic UI screen.

The second control unit 16 transmits at least one of the static and dynamic UI screens to the image forming apparatus 100.

The static UI screen is a UI screen previously stored on the web server 10, and the dynamic UI screen is a UI screen newly generated.

Figure 2:
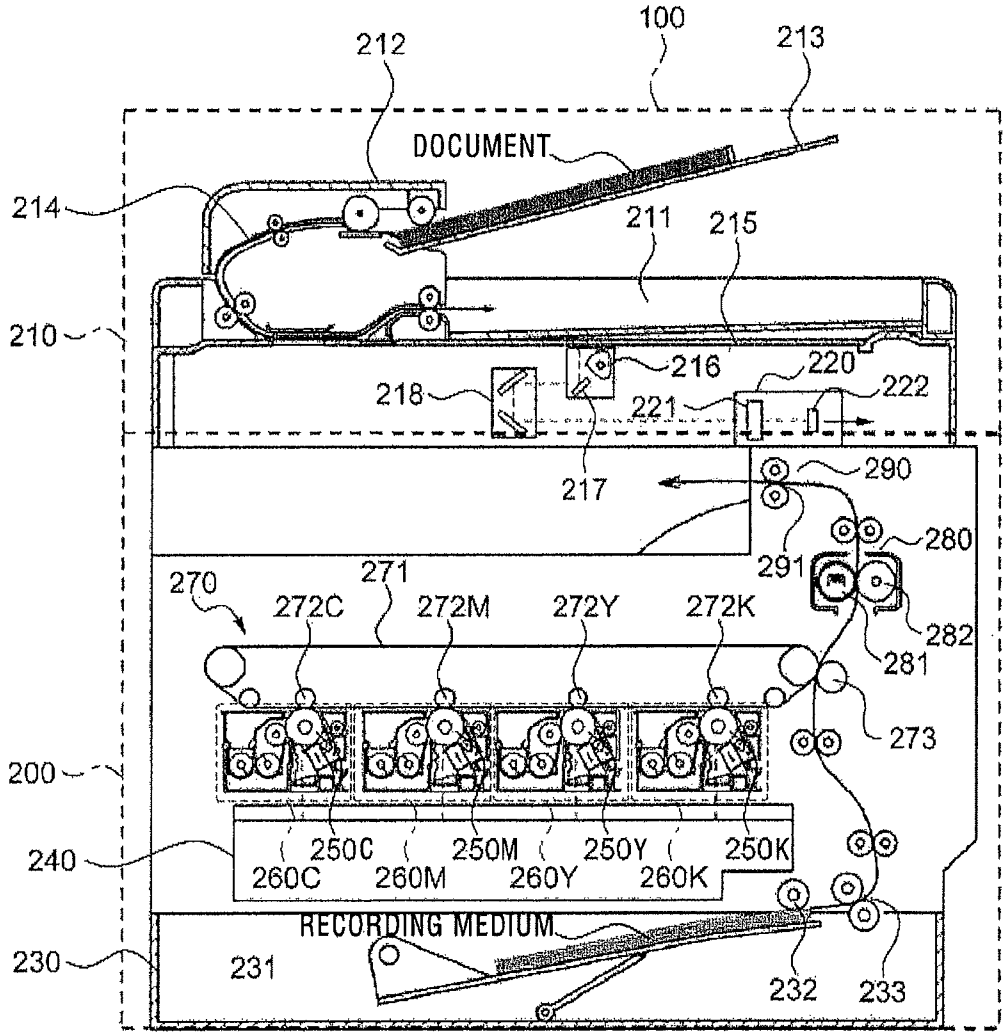
FIG. 2 is a view illustrating the structure of an image forming apparatus according to an embodiment.

FIG. 2 is a view illustrating the construction of an image forming apparatus according to an embodiment.

The image forming apparatus 100 includes a scanning unit 210 and an image forming unit 200.

The scanning unit 210 includes a cover 211 including auto document feeder (ADF) 212 and a scan body 215. The ADF 212 automatically feeds at least one page of document page by page.

The ADF 212 may be replaced with a duplex auto document feeder (DADF) which may feed one and the other sides of a document.

The document piled on a document plate 213 is automatically fed along a feeding path 214 page by page, scanned, and discharged.

The cover 211 is pivotably connected to the scan body 215, and opens or closes the upper side of the scan body 215 where a scan glass is formed. Herein, the scan glass is where a document of one or more pages is placed to be fed manually.

The scan body 215 includes a light source 216 to scan a document, a plurality of mirrors 217, 218 to reflect a reflected light from the light source 216 toward an image sensor 222, and one or more image-focusing lens 221 to focus the reflected lights on the image sensor 222.

Further, the light source 216 and the plurality of mirrors 217, 218 may be accommodated in a movable optical system (not illustrated) and the movable optical system scans a document by maintaining a stationed state or moving reciprocally with respect to the document using driving motor, pulley or the like.

The image sensor unit 220 includes the image focus lens 221, the image sensor 222 and an image sensor driver (not illustrated) to drive the image sensor 222, and an image signal output of the image sensor 222 with respect to the reflected light is converted into a digital signal and inputted to the first control unit 150. The image signal output may be converted into at least one of 8 bits, 16 bits, 24 bits, 32 bits and 64 bits, and the number of bits of the image signal output may vary depending on the image forming apparatus 100.

One example of the image sensor 222 may include a Charge Coupled Device (CCD) sensor or Contact Image Sensor (CIS). In another embodiment, an image sensor in other form which is capable of scanning a document may be implemented.

The image forming unit 200 included in the output unit 180 illustrated in FIG. 1 may be implemented as a Laser Beam printer (LBP) or Inkjet printer according to the manner of printing. In this embodiment, an example of LBP will be explained.

The image forming unit 200 includes a paper feeding unit 230, a laser scanning unit (LSU) 240, a plurality of developing units 260C, 260M, 260Y, 260K including a plurality of photosensitive bodies 250C, 250M, 250Y, 250K a transfer unit 270, a fixation unit 280, and a paper discharge unit 290. The above-mentioned components of the image forming unit 200 may change depending on monochrome printing, or color printing of the LBP, or if in color printing, depending on the manner of developing such as multi-path, single-path, a manner of transfer such as direct transfer or indirect transfer, or the like. In direct transfer, image is transferred from a plurality of photosensitive bodies 250C, 250M, 250Y, 250K onto the recording medium directly, while in indirect transfer, the image is transferred from the plurality of photosensitive bodies in the first transfer, and then transferred from the intermediate transfer belt onto the recording medium in the second transfer.

The paper feeding unit 230 includes a cassette 231 on which recording medium is stacked, a pickup roller 232 which picks up a recording medium from the stack of recording media in the cassette 231, and at least one feed roller 233 to convey the picked-up recording medium.

In this embodiment, one paper feeding unit 230 is explained as an example. However, a plurality of paper feeding units 230 may be formed in the image forming apparatus 100, respectively feeding the stacked recording media therefrom.

The LSU 240 irradiates a light beam corresponding to an image signal to the plurality of photosensitive bodies 250C, 250M, 250Y, 250K to form an electrostatic latent image on the surface thereof.

The LSU 240 may include at least one laser diode not illustrated in FIG. 2, at least one polygon mirror, at least one mirror, or at lest one lens. Further, the LSU 240 may be implemented as a Micro Mechanical System (MEMS) mirror.

The plurality of developing units (260C, 260M, 260Y, 260K) supply developing agent of different colors (Cyan, Magenta, Yellow, Block) to the plurality of photosensitive bodies (250C, 250M, 260Y, 250K) to form a visible image. The plurality of photosensitive bodies (250C, 250M, 250Y, 250K) may be arranged in various formations.

In this embodiment, a Cyan developing unit 260C will be explained as an example, and the rest of developing units (260M, 260Y, 260K) operate on the same principle as the cyan developing unit 260C. In this embodiment, although four-color developing units (260C, 260M, 260Y, 260K) are explained for illustrative purpose, the same principle is extendable to five or more color developing units.

The developing unit 260C includes a charging unit (not illustrated) which charges the photosensitive body 250C with uniform electric potential, a developer supply roller (not illustrated) which supplies developer to the developing roller (not illustrated), a developing roller (not illustrated) which supplies the developer supplied from the developer supply roller onto an electrostatic latent image generated by the LSU 240 on the photosensitive body 250C to form a visible image, a developer cleaner (not illustrated) which removes remaining developer from the photosensitive body 250C after the visible image on the photosensitive body 250C is transferred onto the transfer belt 271, a waste toner container (not illustrated) which collects developer removed by the developer cleaner therein, and a discharge unit (not illustrated) which removes electric potential remaining on the photosensitive body 250C.

The transfer unit 270 includes first transfer rollers 272C, 272M, 272Y and 272K to transfer visible images formed on the plurality of photosensitive bodies 250C, 250M, 250Y, 250K onto the transfer belt 271, and a second transfer roller 273 which transfers a composite image of the plurality of developers onto the recording medium. In this embodiment, the indirect transfer is explained as an example. However, the principle explained above is extendable to the direct transfer in which the composite image is transferred onto the recording medium as the recording medium is passed in between the plurality of photosensitive bodies 250C, 250M, 250Y, 250K and the first transfer rollers 272C, 272M, 272Y, 272K.

The fixation unit 280 may include at least one heat roller 281 and at least one pressure roller 282, and operate to fix the transferred image into the recording medium with heat of the heat roller 281 and pressure of the pressure roller 282.

The paper discharge unit 290 includes at least one roller 291 and operates to discharge a recording medium on which a visible image is formed. Although not illustrated, a duplex path may be provided, along which a recording medium is re-fed instead of being discharged through the paper discharge unit 290 to provide duplex printing function.

Figure 3:
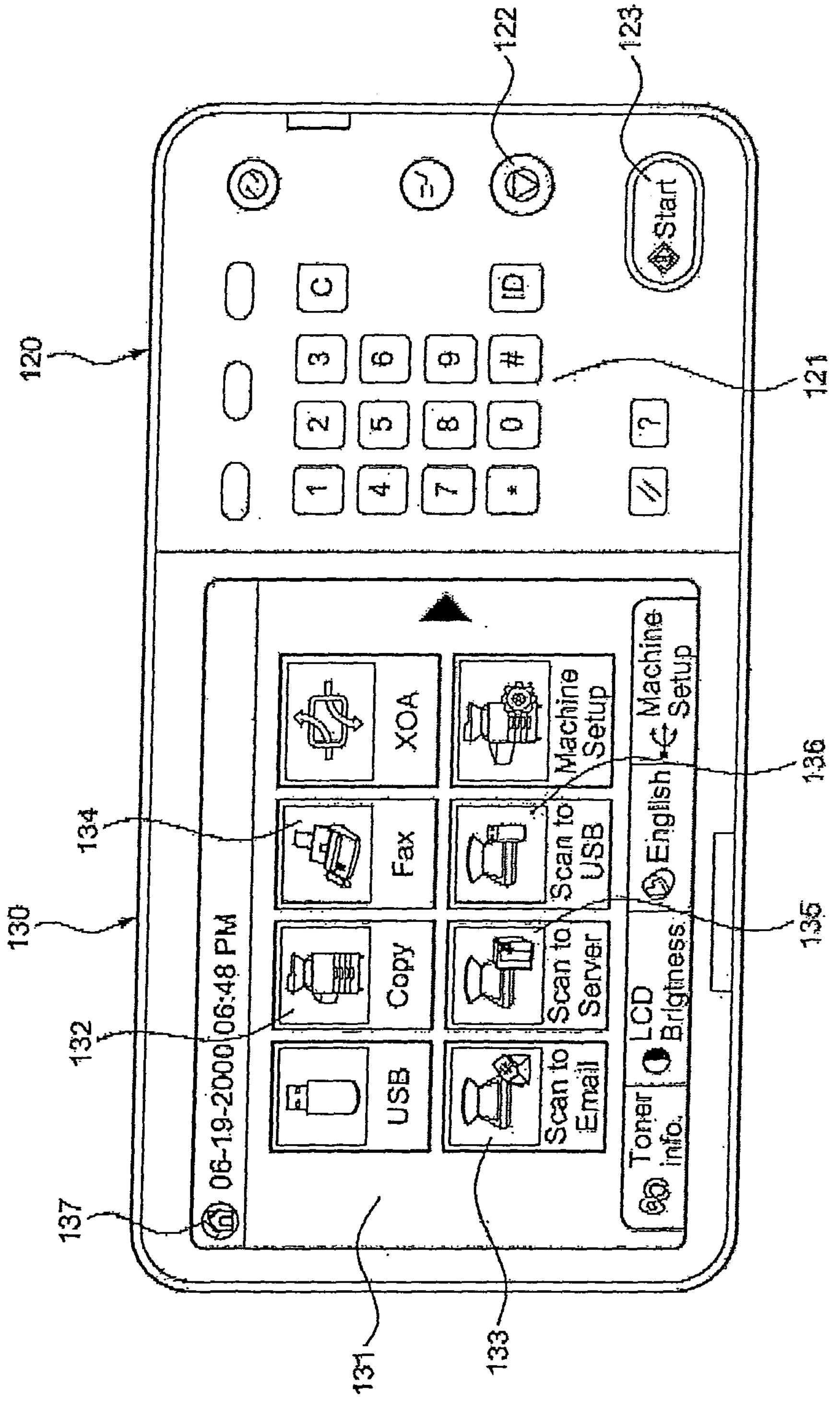
FIG. 3 is a view illustrating a display unit which includes a manipulation unit and a touch screen according to an embodiment.

FIG. 3 illustrates the display unit which includes the manipulation unit and the touch screen.

To be specific, FIG. 3 illustrates a HomeScreen 131 displayed on the display unit 130 in response to a power supply and completion of booting, completion of at least one function, or selecting of HomeScreen icon on the display unit 130 during execution of at least one function, and the display unit 130 of FIG. 3 displays thereon a UI screen according to an embodiment.

The image forming apparatus 100 may perform at least one of copying, printing, scanning, faxing, and file transmitting which may be represented by corresponding function icons on the display unit 130. The user may select at least one function icon through the manipulation unit 120, and options necessary for executing the selected function icon are inputted by the user.

The manipulation unit 120 includes a numeric keypad 121 to be used for inputting a number of copies or necessary figures, a stop button 122, a start button 123 which executes a function to which necessary options are applied, and function buttons for a variety of functions.

The display unit 130 displays, on its HomeScreen 131, the function icons corresponding to copying 132, scanning 133, faxing 134, file transmitting 135, scanning-to-USB memory 136, or XOA (Extensible Open Architecture) 137.

If the user selects at least one function icon through the manipulation unit 120, the HomeScreen 131 displays the function icons so that the selected function icon is distinguished from the rest of one or more un-selected function icons. The HomeScreen 131 is changed into a UI screen to perform a function corresponding to the selected function icon.

The HomeScreen 131 generates the function icons 132 to 136 using the construct information corresponding to the HomeScreen 131 stored in the first storage unit.

At least one of the function icons 132 to 136 may correspond to a function supported by other web server (not illustrated) instead of the web server 10.

That is, even a function icon corresponding to an application provided by a third party also includes an address of other web server (not illustrated) in the function icon information, and a UI screen of a portion corresponding to this icon is received from the other web server (not illustrated).

Accordingly, if a function icon provided by the third party is selected through the manipulation unit 120 or the touch screen of the display unit 130, the first control unit 150 requests a partial UI screen corresponding to the other web server (not illustrated) and the requested partial UI screen is received. In this situation, the partial UI screen is combined with the rest of the UI screen into one single UI screen according to the control of the first control unit. The combined UI screen is displayed on the display unit 130.

On the changed UI screen, options necessary to perform the selected function are displayed, and the user may select the options through the manipulation unit 120. If the display unit 130 is a touch screen, the user may select the options using the touch screen. Further, the display unit 130 may display status information regarding error, preparation, or operation, and residual information of consumables of the image forming apparatus 100.

In this embodiment, the manipulation unit 120 and the display unit 130 are explained as separate components. However, other examples are possible. For example, if the display unit 130 is a touch screen, the user may manipulate the display unit 130 in the same manner he/she manipulates the manipulation unit 120 using the touch screen. Further, the manipulation unit 120 may be replaced with a touch screen in which case the manipulation unit 120 may be omitted.

Figure 4:
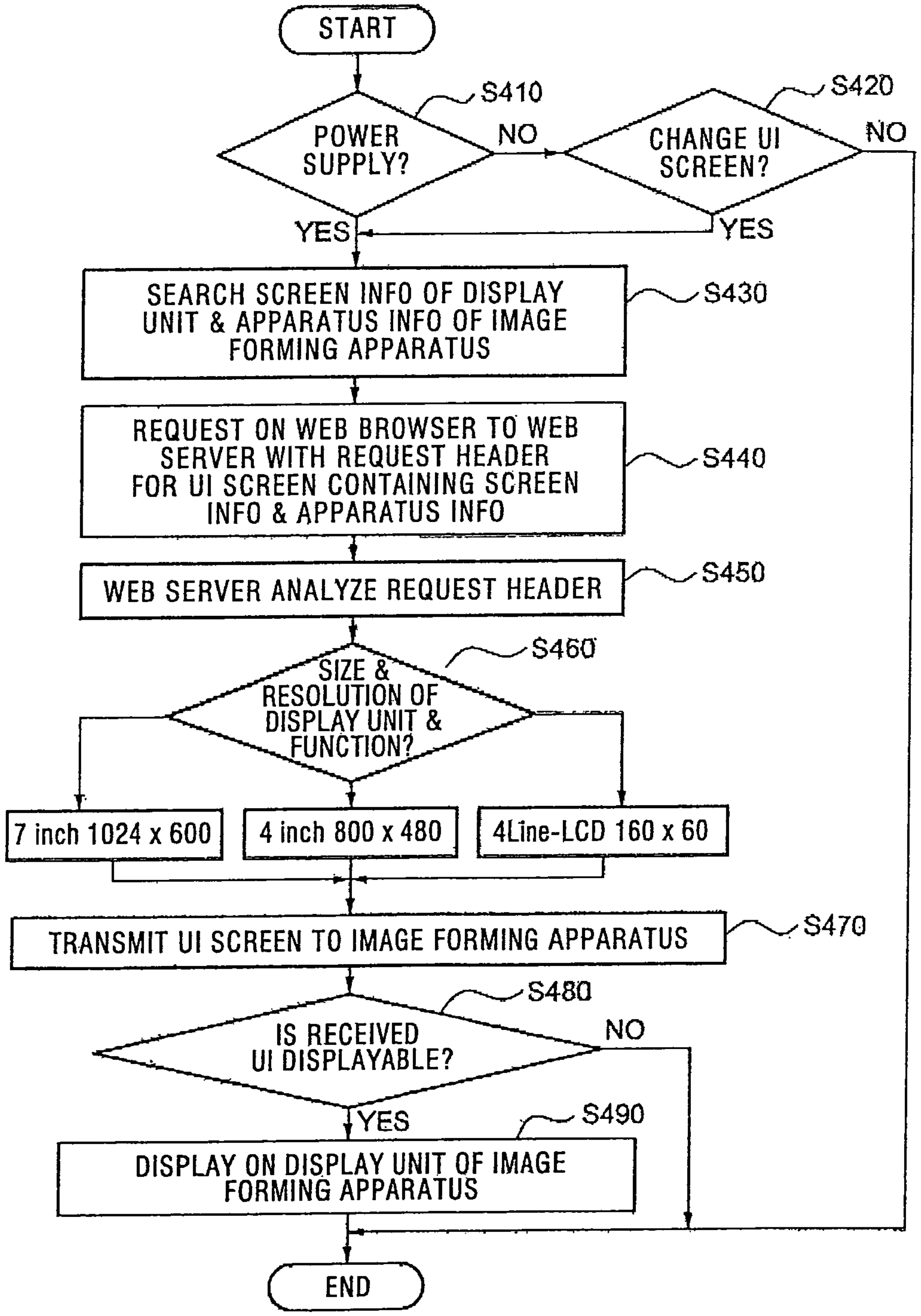
FIG. 4 is a flowchart provided to explain a method for providing a user interface screen of an image forming apparatus according to an embodiment.

FIG. 4 is a flowchart provided to explain a method for providing a UI screen of an image forming apparatus according to an embodiment.

Referring to FIG. 4, according to an embodiment, at S410, it is determined as to whether or not a power switch (not illustrated) of the image forming apparatus 100 is ON, thereby conducting power. In one embodiment, whether or not power is supplied may be determined using a power supply sensor (not illustrated).

If determining that the power is supplied, booting may be carried out according to a control by the first control unit 150 using the supplied power.

In one embodiment, at S430, screen information of the display unit 130 and the apparatus information of the image forming apparatus 100 to request the UI screen to be displayed on the display unit 130, is searched from at least one of the first HDD 140, the ROM 152, and the RAM 153. In this embodiment, at least one of the first HDD 140, the ROM 152, and the RAM 153, is defined as the first storage unit. Further, in this embodiment, the first HDD 140 is explained as an example of the first storage unit. In this embodiment, the screen information and the apparatus information may be searched in order of the first HDD 140, the ROM 152, and the RAM 153, but the priority of search of the first HDD 140, the ROM 152, and the RAM 153 may change according to settings by the user or the administrator.

The screen information of the display unit 130 includes at least one of screen size, resolution, and absence/presence of a touch screen, and the apparatus information of the image forming apparatus 100 includes information that indicates at least one function supported by the image forming apparatus 100, such as, for example, at least one of copying, printing, scanning, faxing, and file transmitting, or model name, or device ID.

On the UI screen corresponding to at least one function supported by the image forming apparatus 100, various options are provided for selection by the user. Information to indicate these various options on the UI screen is called option information. Since the option information increases as there are more selectable options, the UI screen may become complex.

The option information may be initial setting by the manufacturer at the time the product is shipped from the factory, and may be changed when at least one function of the image forming apparatus 100 is upgraded, or a new function is added. In the latter case, the changed option information has to be stored in the image forming apparatus 100, and the changed option information has to be provided to the web server 10.

If the option information of the initial setting is provided to the web server 10 according to a control by the first control unit 150, or if the initial setting has changed, the changed option information is provided to the web server 10.

The option information may be included in a user agent to be provided to the web server 10. In other embodiments, the web server may request option information when the option information has changed.

By way of example, if the operating system (OS) of the image forming apparatus 100 supports Open Platform, applications, or solutions provided by a third party (not the manufacturer) may be added, or a duplex printing unit or a punching unit may be additionally installed as one of the added options. In these cases, the option information, including the apparatus information of the image forming apparatus 100 reflecting the upgraded or added new function, is provided to the web server 10 and the corresponding UI screen is provided to the image forming apparatus 100 from the web server 10 to increase user convenience.

At S440, the first control unit 150 may request the screen information of the display unit 130 and the apparatus information of the image forming apparatus 100 as searched to the at least one web server 10 or the at least one EWS 42 of the digital MFU 40 using the embedded web browser of the image forming apparatus 100. While the web server 10 is explained as an example, the same principle applies to the EWS 42 of the digital MFU 40, or the EWS 174 of the image forming apparatus 100.

Referring to HTTP 1.X protocol, published in Request for Comments 2616 in June 1999, a request header is used when the web browser calls a web page from the web server 10.

The request header includes a user agent which indicates information about the browser that is basically provided by the browser, such as the current browser version and OS name.

Since both the UI screen and the web page may be generated in a web-based language, the UI screen explained above or below has to be understood as a concept that encompasses the web page.

In one embodiment, at S430, as the information corresponding to a UI screen to be received from the web server 10 according to a control of the first control unit 150, the screen information of the display unit 130 and the apparatus information of the image forming apparatus 100 are added to the user agent and requested to the web server. Note that the screen information of the display unit 130 and the apparatus information of the image forming apparatus 100 are not to be construed as limiting the user agent, but rather understood as the information which is included in the request header and requested to the web server 10.

FIG. 5 illustrates an example of a request header according to an aspect.

Referring to FIG. 5, a portion of a HTTP protocol call according to an aspect is illustrated.

In 'GET/homescreen HTTP/1.1', the term 'homescreen' refers to a UI screen as requested, and the term 'HTTP/1.1' refers to HTTP version 1.1. However, other HTTP versions are implementable, and the rules of the request header may vary depending on versions.

In 'Host: www.myprinter.com', the term following 'Host:' indicates address of the web server, and the Absolute Uniform Resource Identifier (URI) or Absolute Path may be stored.

The Absolute URI may be written as protocol name, web server name, IP address, or file name, and the Absolute Path may be written as directory name and file name.

In 'User-Agent: CLX-9000 7Inch 1024×600 TouchScreen', 'CLX-9000' refers to model name, '7Inch' refers to screen size (inch) of the display unit 130, '1024×600' refers to resolution of the display unit 130, and 'TouchScreen' refers to the fact that the display unit 130 is a touch screen. Being written in a text form, the above example includes spaces between the model name, screen size, resolution, and absence/presence of the touch screen to distinguish one from each other, but in other examples, slashes (/) or comma (,) may be used.

S450 will be explained below with reference to FIG. 4. At S450, the second control unit 16 analyzes the request header which is received via the second communication interface 12. The second control unit 16 extracts screen information of the display unit 130 and the apparatus information of the image forming apparatus 100.

Referring to the extracted request header, it is indicated that the image forming apparatus 100 with the model name as CLX-9000, screen size of the display unit 130 as 7 inches, resolution as 1024×600, and with the touch screen is requesting the web server 10 a UI screen to be displayed on the display unit 130.

The second control unit 16 may search UI screens corresponding to the screen information of the display unit 130 and the apparatus information of the image forming apparatus 100 as extracted, and select the UI screen. Further, a previously stored UI screen may be searched using a lookup table (not illustrated) of the second HDD 14.

The lookup table may have appropriate form suitable for the apparatus information of the image forming apparatus 100 and the screen information of the display unit 130. By way of example, a horizontal axis of the lookup table may be filled with apparatus information of the image forming apparatus 100 and a vertical axis is filled with screen information of the display unit 130. The horizontal and vertical axes may be changed with each other.

The UI screen may be searched from the ROM (not illustrated) or RAM (not illustrated) of the second control unit 16 and selected.

Further, the second control unit 16 determines whether the UI screen to be selected is static or dynamic, using the extracted screen information of the display unit 130 and apparatus information of the image forming apparatus 100. A UI screen that corresponds to the user interface may be selected according to the determination.

That is, at S460, if the extracted information indicates the static UI screen, the static UI screen is selected from the second HDD 14.

At S470, the selected static UI screen is transmitted to the image forming apparatus 100 via the second communication interface 12.

On the contrary, if dynamic UI screen is determined, the dynamic UI screen is generated in serverside scripting language according to a control by the second control unit 16. At S470, the generated dynamic UI screen is transmitted to the image forming apparatus via the second communication interface 12.

Among the scripting languages used in web, the serverside scripting language such as Hypertext Preprocessor (PHP), Active Server Pages (ASP), Java Server Pages (JSP), is executed on the serverside.

The request header by the image forming apparatus 100 is received at the web server 10. That is, the web server 10 corresponding to the web server address of the request header, receives the request header. In this embodiment, the web server 10 is explained as an example. However, the same principle may apply to the EWS 42 of the MFU 40 or the EWS 174 of the image forming apparatus 100.

FIG. 6 illustrates an example of a source of the static UI screen that corresponds to the request header according to an aspect.

The UI screen may be written as HTML (Hypertext Markup Language), XHTML (Extensible Hypertext Markup Language), XML (Extensible Markup Language), or CSS (Cascading Style Sheet), but not limited to these examples only. That is, the UI screen may be generated in any serverside scripting language.

FIG. 7 illustrates an example of a source of a dynamically generated UI screen in response to a request header according to an aspect.

Referring to FIG. 7, a UI screen, which is dynamically generated using one of the serverside scripting languages, i.e., PHP, according to an aspect is illustrated.

The screen information of the display unit 130 and the apparatus information of the image forming apparatus 100 are read out from the user agent and analyzed, and the text string is separated using spaces. After separating, according to the analysis of the request header, a UI screen is dynamically generated by show7inch( ), show4inch( ), show4line( ) functions. At S470, the generated dynamic UI screen is transmitted to the image forming apparatus 100. Further, it is possible that the generated dynamic UI screen is stored in the second HDD 14. If so, a file name may be given using the information of the request header and the generated UI screen and stored. If the UI screen is stored, a lookup table may be utilized as in the case of the static UI screen.

After that, if the same image forming apparatus 100 requests same UI screen, a newly-generated dynamic UI screen may be transmitted, or alternatively, a previously stored dynamic UI screen may be searched and transmitted to the image forming apparatus 100.

At least one of the static UI screen and dynamic UI screen transmitted from the web server 10 is stored in the first HDD 140 via the first communication interface 170.

At S480, the first control unit 150 determines whether it is possible to display the stored UI screen on the display unit 130 or not. The determination as to the availability for display, may be based on comparison between a request header transmitted to the web server and a UI screen received from the web server. By way of example, the request header of the image forming apparatus 100 is 'User-Agent: CLX-9000 7Inch 1024×600 TouchScreen', but the UI screen received from the web server 10 is 'CLX-9000 4Inch 800×480 TouchScreen'. In this example, it is necessary for the first control unit 150 to determine the availability for display. That is, the received UI screen is not suitable for display on the 7 inch display unit 130 due to the different screen sizes between the display unit 130 and the received UI screen. As a result, the image forming apparatus 100 is not appropriate for the user to use.

Further, an occasion may sometimes arise in which the image forming apparatus 100 supports the functions of Scan/Print/Copy/Fax but the received UI screen supports Scan/Print/Copy only.

At S490, according to the result of determination, if it is possible to display on the display unit 130, the UI screen is displayed on the display unit 130 according to a control by the first control unit 150. If the image forming apparatus 100 has a plurality of control units, the control unit that controls the display unit 130, controls so that a UI screen is displayed.

If the result of determination indicates unavailability to display on the display unit 130, the received UI screen is not displayed, but terminated or re-tried according to a control of the first control unit 150.

The user may select a function icon corresponding to at least one function regarding the UI screen displayed on the display unit 130 of the image forming apparatus.

Figure 12A:
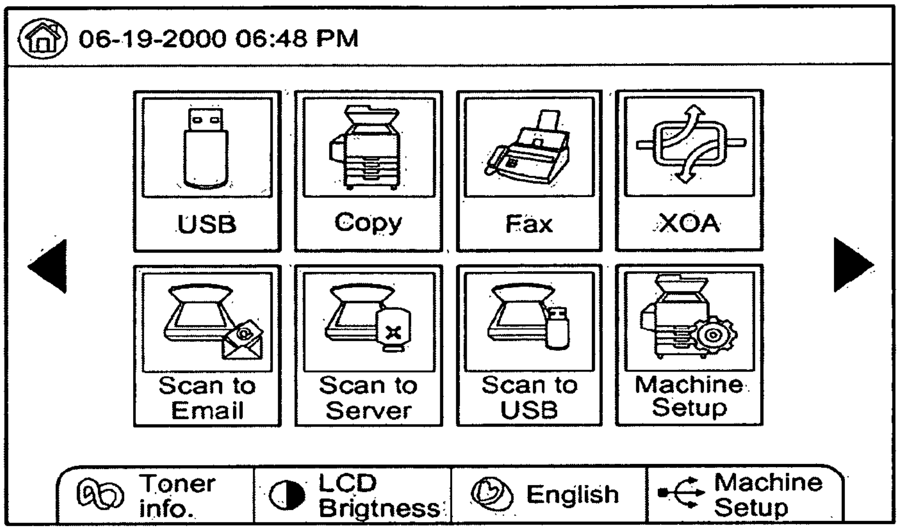
FIGS. 12A to 12C are views illustrating an example of a user interface screen received in response to screen information of a display unit and apparatus information of the image forming apparatus according to an aspect.
Figure 12B:
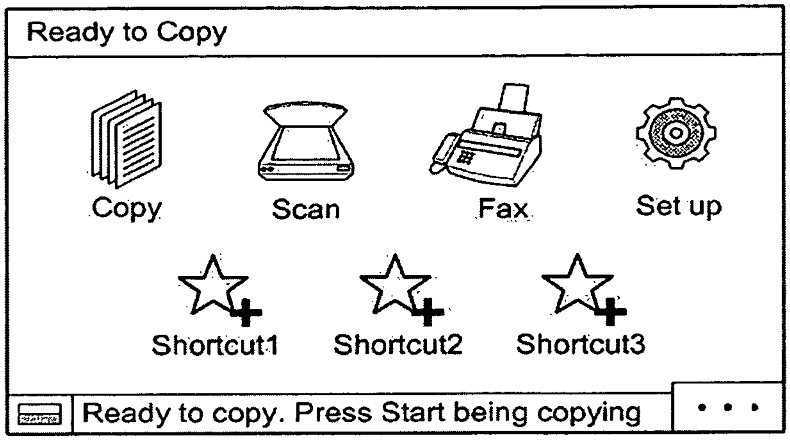
Figure 12C:
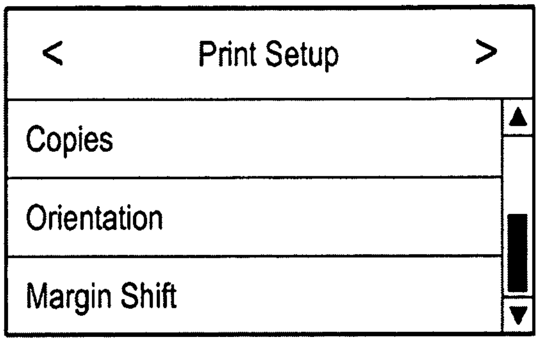

FIGS. 12A to 12C illustrate an example of UI screen received in response to the screen information of the display unit and the apparatus information of the image forming apparatus according to an aspect.

Referring to FIG. 12A, an example of UI screen appears on the display unit 130 of the image forming apparatus 100 with model name as CLX-9000, 7 inches as screen size, 1024×600 as resolution, and a touch screen in response to an application of power supplied to the image forming apparatus 100.

Referring to FIG. 12B, an exemplary UI screen appears on the display unit 130 of the image forming apparatus 100 according to the CLX-9000 as model name, 7 inches as screen size, 1024×600 as resolution, and a touch screen.

Referring to FIG. 12C, an example of UI screen corresponding to a line LCD with CLX-1000, 4 Line LCD, and 160×60 resolution appears on the display unit 130 of the image forming apparatus 100. Unlike the touch screen, the UI screen of 4 Line LCD may be text based that excludes icons or images. However, the icons or images may be included as necessary.

Referring to FIG. 4, at S410, it is determined as to whether or not a power switch (not illustrated) of the image forming apparatus 100 is ON, thereby conducting power. If the determination indicates that power is not supplied, at S420, it is determined as to whether or not the UI screen on the display unit 130 of the image forming apparatus 100 is changed.

It is determined as to if the user selects a function icon that corresponds to at least one function on the UI screen. That is, if input is made through the manipulation unit 120 or the display unit 130 is a touch screen, it is determined that the UI screen is changed in response to selection of an icon or image.

If the result of determination indicates that UI screen is changed, operation goes to S430. Otherwise, i.e., if the determination does not indicate UI screen change, the operation may be terminated or re-tried.

FIG. 8 illustrates an example of a request header according to an aspect.

Referring to FIG. 8, a portion of HTTP protocol call is illustrated according to an aspect.

FIG. 8 is almost identical to FIG. 5 except for the presence of 'GET/XOA'. Accordingly, the like elements or functions will be referenced to FIG. 5.

FIG. 5 particularly illustrates an example where a HomeScreen is requested to the web server 10, but referring to FIG. 8, a request header is provided to the web server 10 in response to selection of XOA icon 137 on the UI screen by inputting through the manipulation unit 120 or, if the display unit 130 is a touch screen, in response to selection by clicking with reference to FIG. 8.

The UI screen corresponding to the screen information of the display unit 130 and the apparatus information of the image forming apparatus 100 is requested to the web server 10 using the web browser of the image forming apparatus 100.

Figure 13A:
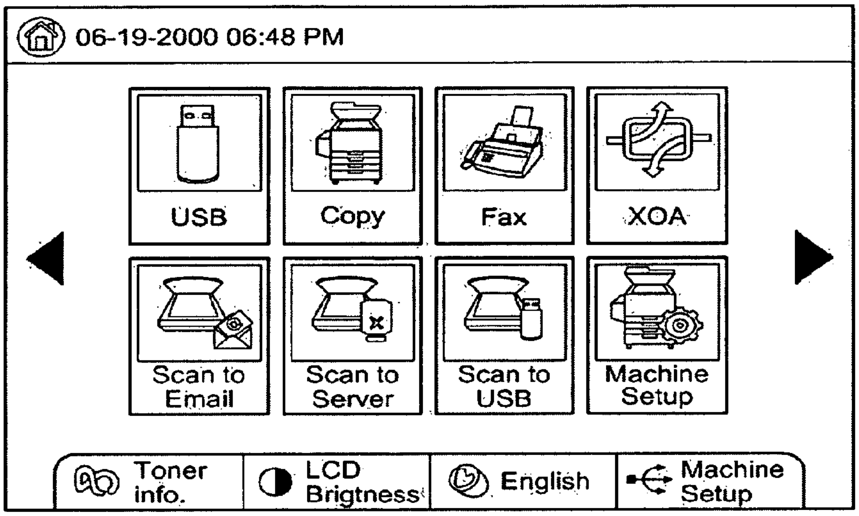
FIGS. 13A and 13B are views illustrating an example of changing user interface screen according to an aspect.
Figure 13B:
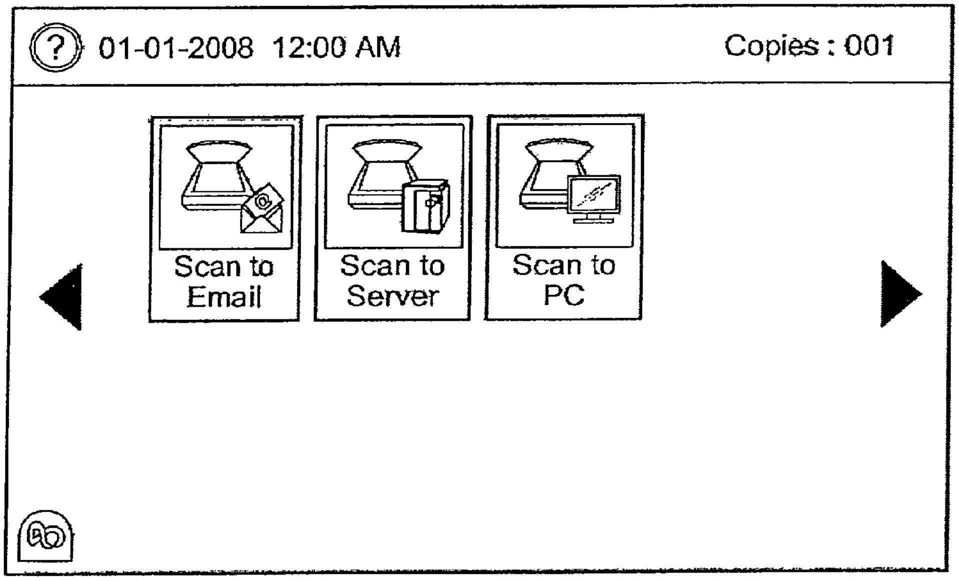

FIGS. 13A and 13B illustrate an example of changing UI screen according to an aspect.

Referring to FIG. 13A, an example of UI screen corresponding to model name CLX-9000, 7 inches, resolution 1024×600, with a touch screen appears on the display unit 130 of the image forming apparatus 100.

The above example applies to when the XOA icon 137 is selected by an input through the manipulation unit 120, or by clicking if the display unit 130 is a touch screen.

FIG. 13B illustrates an example of UI screen received from the web server 10 corresponding to the selected XOA icon 137 in FIG. 13A.

A function icon corresponding to the function requested by the user may be selected from the displayed UI screen and the image forming apparatus 100, is operated accordingly.

FIG. 9 illustrates an example of a request header including at least one function of the image forming apparatus according to an aspect.

Referring to FIG. 9, a portion of HTTP protocol call according to an aspect is illustrated.

FIG. 9 is similar to FIG. 5 except for the different functions regarding 'User-Agent: CLX-9000 7Inch 1024×600 TouchScreen Scan/Print/Copy/Fax'. The like elements or functions are referenced to FIG. 5.

Referring to FIG. 5, the HomeScreen 131 is requested to the web server 10. FIG. 9 is similar to FIG. 5, but 'Scan/Print/Copy/Fax' is added to the user agent. Accordingly, depending on the image forming apparatus 100, a request header (FIG. 5) may be requested to the web server 10, or a request header (FIG. 9) may be requested to the web server 10. This is changeable depending on the image forming apparatus.

Compared to FIG. 5, in FIG. 9, a UI screen corresponding to the added 'Scan/Print/Copy/Fax' is requested to the web server 10, and the web server 10 transmits at least one of the static UI screen and the dynamic UI screen to the image forming apparatus 100.

FIG. 10 illustrates a source of static UI screen written in HTML from the web server 10 according to an aspect.

That is, FIG. 9 illustrates briefly a source of static UI screen which is transmitted from the web server 10 in response to the request header to the web server 10.

The UI screen may be written in HTML, XHTML, XML or any other web based language.

FIG. 11 illustrates an example of a dynamically generated UI screen in response to a request header according to an aspect.

Referring to FIG. 11, a UI screen, generated dynamically using PHP, according to an aspect is illustrated.

The screen information of the display unit 130 and the apparatus information of the image forming apparatus 100 included in the user agent are read out from the user agent and analyzed, and the text string is separated using spaces. After separating, a UI screen is generated dynamically using showScan( ), showPrint( ), showCopy( ), showFax( ) functions according to the analysis of the request header. The above functions will be explained briefly. At S470, the generated dynamic UI screen is transmitted to the image forming apparatus 100. Further, it is possible to store the generated dynamic UI screen on the second HDD 14. If so, the information of the request header and the UI screen are mapped and stored, so that a new dynamic UI screen may be generated and transmitted or the previously stored dynamic UI screen may be transmitted in response to the same request by the image forming apparatus 100.

If the UI screen is stored, a lookup table may be utilized as in the case of static UI screen.

The method explained above may be implemented in the form of a program command which is executable through a variety of computing means including at least one processor, and recorded on a computer readable recording medium. The computer readable medium may include program command, data file, data structure alone or in combination. The program command recorded on the medium may be designed or constructed specifically for the embodiment/embodiments or those which are known and available for use among those skilled in the art of computer software.

The foregoing exemplary embodiments and advantages are merely exemplary and are not to be construed as limitation. The present teaching may be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An image forming apparatus, comprising:

a display unit a first communication interface unit to connect to a web server;

a first storage unit to store therein screen information of the display unit and apparatus information of the image forming apparatus; and a control unit to control the image forming apparatus to transmit at least one of the screen information of the display unit and the apparatus information of the image forming apparatus to the web server via the first communication interface unit, for requesting of a user interface screen corresponding to at least one function supported by the image forming apparatus, to receive the user interface screen corresponding to the at least one of the screen information and the apparatus information from the web server, and to display the received user interface screen on the display unit.

2. The image forming apparatus of claim 1, wherein the screen information comprises at least one of a size or a resolution of the user interface screen, or presence of a touch screen.

3. The image forming apparatus of claim 1, wherein the apparatus information comprises at least one of: the at least one function supported by the image forming apparatus; a model name of the image forming apparatus; and a device ID of the image forming apparatus.

4. The image forming apparatus of claim 1, wherein the control unit transmits the at least one of the screen information and the apparatus information using a request header of a web browser, and the request header comprises at least one of an address of the web server, and a user agent corresponding to the screen information and the apparatus information.

5. The image forming apparatus of claim 1, wherein the user interface screen is generated based on a web-based language.

6. The image forming apparatus of claim 1, wherein the web server comprises at least one of an external web server accessible via the first communication interface unit, and an embedded web server of the image forming apparatus.

7. The image forming apparatus of claim 1, wherein, if power is supplied to the image forming apparatus, or to change the user interface screen of the display unit, the control unit requests the web server for the user interface screen corresponding to the screen information and the apparatus information.

8. A web server to connect to an image forming apparatus, the web server comprising:

a communication interface unit to connect to a web browser of the image forming apparatus; and a control unit to control the web server to extract screen information of a display unit and apparatus information of the image forming apparatus from a request header of the web browser when the request header including a request of a user interface screen corresponding to at least one function supported by the image forming apparatus is received via the communication interface unit and to transmit the user interface screen corresponding to the extracted screen information and the apparatus information to the image forming apparatus via the communication interface unit.

9. The web server of claim 8, further comprising a storage unit which stores the user interface screen displayed on the display unit of the image forming apparatus, wherein the control unit transmits to the image forming apparatus at least one of the user interface screen stored in the storage unit and a user interface screen dynamically generated according to the screen information and the apparatus information.

10. The web server of claim 9, wherein the dynamically generated user interface screen is generated in serverside scripting language.

11. A method for providing a user interface screen of an image forming apparatus comprising a display unit and a web browser, the method comprising:

if a power is supplied to the image forming apparatus, transmitting screen information of the display unit and apparatus information of the image forming apparatus to a web server via a first communication interface unit using the web browser, for requesting of a user interface screen corresponding to at least one function supported by the image forming apparatus;

receiving the user interface screen corresponding to the screen information and the apparatus information from the web server; and displaying the received user interface screen on the display unit, wherein the user interface screen indicates at least one of the functions of copying, scanning, faxing, and file transmitting supported by the image forming apparatus.

12. The method of claim 11, wherein the screen information comprises at least one of a size or a resolution of the user interface screen, or presence of a touch screen.

13. The method of claim 11, wherein the apparatus information comprises at least one of: the at least one function supported by the image forming apparatus; a model name of the image forming apparatus; and a device ID of the image forming apparatus.

14. The method of claim 11, wherein the transmitting the screen information and the apparatus information to the web server comprises transmitting a request header of the web browser to the web server, and the request header comprises at least one of an address of the web server and a user agent corresponding to the screen information and the apparatus information.

15. The method of claim 11, wherein the transmitting the screen information of the display unit and the apparatus information of the image forming apparatus is carried out, if the power is supplied to the image forming apparatus or if it is necessary to change the user interface screen of the display unit.

16. The method of claim 11, wherein the received user interface screen is at least one of a user interface screen previously stored on the web server corresponding to the display unit of the image forming apparatus, or a dynamically-generated user interface screen.

17. The method of claim 11, wherein the received user interface screen is generated in web-based language.

18. The method of claim 13, further comprising providing option information regarding at least one function supported by the image forming apparatus to the web server, wherein the receiving the user interface screen from the web server comprises receiving the user interface screen reflecting the option information.

19. The method of claim 11, further comprising analyzing to determine if the received user interface screen is displayed on the display unit, wherein if it is determined that it is impossible to display the user interface screen, a warning message is displayed on the display unit.

20. A non-transitory computer readable medium storing a program to control at least one processor to execute the method of claim 11.

* * * * *